3,332,969
PROCESS FOR THE RECOVERY OF β-SITOSTEROL FROM VEGETABLE MATTER
Marland P. Hutt, Jr., Saline, Mich., assignor to Owens-Illinois, Inc., a corporation of Ohio
No Drawing. Filed Sept. 13, 1965, Ser. No. 487,039
5 Claims. (Cl. 260—397.25)

This invention relates to a process for the separation of β-sitosterol from wood and wood products.

A plurality of processes are known in the prior art for the separation of sterol type products from vegetable matter. These prior art processes usually saponify the raw material with the result that an unnecessary amount of impurities are carried into the saponified mixture. Due to this fact, additional purification steps are necessary in order to achieve pure β-sitosterol. By the process of this invention, the vegetable matter which contains the β-sitosterol is extracted prior to the saponification step with the result that it is possible to produce pure β-sitosterol without an excessive number of purifying steps. To be more specific, dihydrositosterol is not carried forward as an impurity in the β-sitosterol.

Accordingly, the primary object of this invention is the separation of β-sitosterol from vegetable matter.

Another object of this invention is the preparation of pure β-sitosterol from vegetable matter.

The process of this invention generally comprises the steps of: (1) Extraction of the vegetable matter with an alcohol or alcohol-benzene mixture that will extract the β-sitosterol containing component. (2) Removal of the extracting solvent. (3) Saponify with a basic solution. (4) Extract with a solvent to effect the separation of the saponifiable fraction from the unsaponifiable fraction. (5) Precipitation of the sterols. (6) Separation of the β-sitosterol crystals.

The process of this invention is adapted to utilize a wide range of starting materials. Examples of these starting materials are hardwood chips, softwood chips, wheat, corn, barley, etc. A preferred starting material is southern pine chips.

A suitable amount of one of the above described starting materials is then extracted with an excess of an extracting solvent. Suitable extracting solvents are alcohols having from one to five carbon atoms including both the straight and branch chain alcohols and commercial mixtures of the alcohols. A preferred initial extraction medium is isopropyl alcohol. Mixtures of alcohols and benzene can also be used as an extracting medium.

The initial extraction step is carried out for a period of time of from about 4 to about 16 hours. A more preferred range of time for the extraction step is from about 6 to about 8 hours. This initial extraction step is carried out at a reflux temperature, this temperature being dependent on the boiling point of the alcohol or alcohol-benzene mixture which is utilized as an extraction medium.

The solvent layer is then separated from the vegetable residue in a conventional manner for example, by filtration. The extraction can also be carried out in the vapor phase wherein the extracting medium and the extractive are automatically removed from the vegetable material. The excess solvent is then removed by evaporation to produce a resinous mass which contains the β-sitosterol.

The resinous β-sitosterol containing mass as produced by the above described extraction step is then saponified with an alcoholic solution of a basic compound. Examples of suitable basic compounds include alkali and alkaline earth metal hydroxides. Specific examples of suitable basic compounds adapted for use in the process of this invention include sodium hydroxide, potassium hydroxide and calcium hydroxide. The basic compound can be dissolved in a lower alcohol, water or a mixture of water and alcohol. Examples of suitable alcohols includes the lower alcohols as described above. Methanol is preferred as a solvent medium for the saponifying basic material.

The saponification is usually carried out at reflux temperatures, said temperatures being dependent on the boiling point of the lower alcohol being utilized. The saponification is carried out for a period of time of from about 15 minutes to about 6 hours with a preferred reaction time being between one and two hours.

The saponified mixture which contains both the saponified and unsaponified components of the original extract is then diluted with water. This mixture is then extracted with multiple aliquots of ether to effect the separaion of the saponified and unsaponified components. The unsaponified components are dissolved in the ether aliquots and are thereby removed from the saponified components by the extraction. Suitable ethers include the lower ethers, that is, ethers containing from 2 to 10 carbon atoms, and commercial products which are a mixture of ethers. However, diethyl ether is preferred. Upon evaporation of the ether from the mixture, the unsaponifiable materials remain. Prior to removal of the ether by evaporation, the ether extract may be washed with a solvent such as water.

The β-sitosterol is then precipitated from the ether soluble fraction which results from the above-described ether extraction. That is, the β-sitosterol is precipitated from the unsaponified fraction which is separated via the ether extraction. The precipitation is effected by the addition of an excess of a lower alcohol. Lower alcohols as described above can be utilized as a precipitating agent. Methanol is preferred for the precipitation of β-sitosterol.

The product sterol can be purified by repeated washing with alcohol, redissolving in ether and reprecipitation with an alcohol. Likewise, purification can be effected by reprecipitation from an alcohol.

The precipitated β-sitosterol is then separated from the liquid fraction by physical means. Filtration is particularly suited to the separation of these fractions.

The following examples will illustrate this invention. The examples are given for the purpose of illustration and not limitation.

*Example I*

Southern pine chips were extracted with an excess of anhydrous isopropanol at reflux temperature. The anhydrous isopropanol was then separated from the spent southern pine chips and the anhydrous isopropanol distilled off, leaving pine wood extractives. 50 grams of this extractive was then saponified with 150 ml. of a 2 normal solution of potassium hydroxide in methanol and allowed to cool. The saponified material containing both the saponified and unsaponified compounds wa diluted with 200 ml. of water and allowed to cool. The saponified material was then extracted with four 100 ml. portions of diethyl ether. The ether extract wa separated and washed with two 50 ml. portions of wate and the diethyl ether evaporated off in a steam bath leaving the unsaponified components of the pine woo extract. 100 ml. of the methanol was added to this un saponifiable fraction, thereby causing the formation o a precipitate. The precipitate was then filtered off an washed with methanol. The precipitate was then redis solved in ethyl ether and methanol added. The solutio was concentrated to 50 ml. on a steam bath. Upo refrigeration, 150 mg. of needle-like crystals of β-sitc sterol were isolated. The presence of γ-sitosterol was cor firmed by carbon and hydrogen analysis and by th preparation of a derivative. The structure was likewise confirmed by infrared and nuclear magnetic procedures.

Example II 214.2 grams of the pine wood extractives, as produced by the procedure described in Example I, were saponified with 645 ml. of 2 normal potassium hydroxide in methanol. The saponification was carried out at reflux temperature for 1½ hours. The saponified mixture was then diluted with water to 3500 ml. The mixture was then extracted with four 200 ml. portions of diethyl ether. The ether extract was then washed with water and the ether evaporated off, thereby removing the unsaponified component of the pine wood extract. 400 ml. of methanol was then added to the unsaponifiable component which resulted in the formation of a white precipitate. The precipitate was then filtered and washed with methanol. Ether was then added to redissolve the precipitate which was subsequently reprecipitated with methanol. The ether was evaporated off.

Recrystallization was then effected by redissolving the precipitatable in ether and reprecipitation with methanol. 2.62 grams of crude pale yellow solid β-sitosterol was separated by cold filtration from which was separated 1.5 grams of pure β-sitosterol. The presence of β-sitosterol was confirmed by carbon and hydrogen analysis and by the preparation of a derivative. The structure was likewise confirmed by infrared and nuclear magnetic procedures.

What is claimed is:

1. A process for the separation of the β-sitosterol alcohols that are contained in vegetable matter which comprises the steps of extracting with a lower alcohol, removal of the alcohol, saponifying with an alcoholic basic solution, extracting with ether, precipitating the β-sitosterol by the addition of a lower alcohol and filtering to separate the crystalline β-sitosterol.

2. The process of claim 1 wherein the initial extraction is carried out with a mixture of anhydrous lower alcohol and benzene.

3. A process for the separation of β-sitosterol from wood chips which comprises the steps of extracting the wood chips with a lower alcohol, removal of the alcohol, saponifying with a solution comprising a lower alcohol and a basic compound wherein the basic compound is sodium hydroxide or potassium hydroxide, extracting with ether, precipitating the β-sitosterol by the addition of a lower alcohol and filtering to separate the β-sitosterol.

4. A process for the separation of β-sitosterol from southern pine wood chips which comprises the steps of extracting the southern pine wood chips with isopropyl alcohol, saponifying with a solution of potassium hydroxide in methanol, extracting with diethyl ether, precipitating the β-sitosterol by the addition of methanol and filtering to separate the β-sitosterol.

5. The process of claim 4 wherein the southern pine wood chips are initially extracted with a mixture of isopropyl alcohol and benzene.

References Cited
UNITED STATES PATENTS 2,527,602 10/1950 Wall _____ 260—397.25
2,839,544 6/1958 Greiver et al. ____ 260—397.25

LEWIS GOTTS, *Primary Examiner.*

ELBERT L. ROBERTS, *Examiner.*